US010686788B2

(12) United States Patent
Gillett et al.

(10) Patent No.: US 10,686,788 B2
(45) Date of Patent: *Jun. 16, 2020

(54) DEVELOPER BASED DOCUMENT COLLABORATION

(71) Applicant: Amazon Technologies, Inc., Seattle, WA (US)

(72) Inventors: Kevin Gillett, Menlo Park, CA (US); Noah Anthony Eisner, Menlo Park, CA (US); Arun Ponniah Sethuramalingam, San Jose, CA (US); Wei Lien Stephen Dang, Mountain View, CA (US); Stephen Joseph Oakley, Mountain View, CA (US)

(73) Assignee: Amazon Technologies, Inc., Seattle, WA (US)

( * ) Notice: Subject to any disclaimer, the term of this patent is extended or adjusted under 35 U.S.C. 154(b) by 296 days.

This patent is subject to a terminal disclaimer.

(21) Appl. No.: 15/823,429

(22) Filed: Nov. 27, 2017

(65) Prior Publication Data

US 2018/0097812 A1    Apr. 5, 2018

Related U.S. Application Data

(63) Continuation of application No. 14/175,870, filed on Feb. 7, 2014, now Pat. No. 9,832,195.

(51) Int. Cl.
*G06F 16/30* (2019.01)
*H04L 29/06* (2006.01)
(Continued)

(52) U.S. Cl.
CPC .............. *H04L 63/10* (2013.01); *G06F 16/13* (2019.01); *G06F 16/16* (2019.01); *G06F 16/178* (2019.01);
(Continued)

(58) Field of Classification Search
CPC ........... G06F 16/24573; G06F 16/1873; G06F 16/9535
(Continued)

(56) References Cited

U.S. PATENT DOCUMENTS 5,251,315 A    10/1993 Wang
5,577,188 A    11/1996 Zhu
(Continued)

FOREIGN PATENT DOCUMENTS

EP    1881440 A1    1/2008
JP    H10240220 A    9/1998
(Continued)

OTHER PUBLICATIONS

Australian Notice of Acceptance for Patent Application dated Nov. 17, 2017, Patent Application No. 2014346473, filed Nov. 10, 2014, 3 pages.
(Continued)

*Primary Examiner* — Sana A Al-Hashemi
(74) *Attorney, Agent, or Firm* — Davis Wright Tremaine LLP

(57) ABSTRACT

Organizations maintain and generate large amounts of documentation and entities of these organizations often need to collaborate on generating and reviewing this information. There is a need to maintain and store this documentation remotely in such a way that the entities of these organizations may collaborate with each other. A document management a collaboration system is provided to enable entities to collaborate with each other. Furthermore, developers may interface with the document management and collaboration system to provide add-in services and components to the document management and collaboration system. These add-in service and components may expand the capabilities
(Continued)

of the documents and collaborations enabled by the document management and collaboration system.

20 Claims, 9 Drawing Sheets

(51) Int. Cl.
| | |
|---|---|
| *G06F 16/13* | (2019.01) |
| *G06F 16/16* | (2019.01) |
| *G06F 16/93* | (2019.01) |
| *G06F 16/178* | (2019.01) |
| *G06F 16/182* | (2019.01) |
| *G06F 16/188* | (2019.01) |
| *G06F 16/18* | (2019.01) |
| *G06F 16/9535* | (2019.01) |
| *G06F 21/62* | (2013.01) |
| *H04L 12/58* | (2006.01) |
| *H04L 29/08* | (2006.01) |

(52) U.S. Cl.
CPC .......... *G06F 16/182* (2019.01); *G06F 16/183* (2019.01); *G06F 16/1873* (2019.01); *G06F 16/192* (2019.01); *G06F 16/93* (2019.01); *G06F 16/9535* (2019.01); *G06F 21/62* (2013.01); *H04L 51/04* (2013.01); *H04L 63/101* (2013.01); *H04L 63/20* (2013.01); *H04L 51/22* (2013.01); *H04L 67/02* (2013.01); *H04L 67/306* (2013.01)

(58) Field of Classification Search
USPC ....... 707/607, 609, 687, 705, 769, 790, 813, 707/821
See application file for complete search history.

(56) References Cited

U.S. PATENT DOCUMENTS

| | | |
|---|---|---|
| 5,596,754 A | 1/1997 | Lomet |
| 5,832,470 A | 11/1998 | Morita et al. |
| 5,878,398 A | 3/1999 | Tokuda et al. |
| 5,911,140 A | 6/1999 | Tukey et al. |
| 5,991,713 A | 11/1999 | Unger et al. |
| 6,314,425 B1 | 11/2001 | Serbinis et al. |
| 6,397,205 B1 | 5/2002 | Juola |
| 6,442,555 B1 | 8/2002 | Shmueli et al. |
| 6,505,195 B1 | 1/2003 | Ikeda et al. |
| 6,553,365 B1 | 4/2003 | Summerlin et al. |
| 6,687,876 B1 | 2/2004 | Schilit et al. |
| 6,687,878 B1 | 2/2004 | Eintracht et al. |
| 6,725,239 B2 | 4/2004 | Sherman et al. |
| 6,763,346 B1 | 7/2004 | Nishida et al. |
| 7,177,886 B2 | 2/2007 | Pruet, III |
| 7,882,110 B2 | 2/2011 | Bahr |
| 8,271,574 B1 | 9/2012 | Srinivasan et al. |
| 8,429,753 B2 | 4/2013 | Skaria et al. |
| 8,527,461 B2 | 9/2013 | Ducott, III et al. |
| 8,655,950 B2 | 2/2014 | Scherpa et al. |
| 8,825,502 B2 | 9/2014 | Bormann et al. |
| 8,843,494 B1 | 9/2014 | Sampson |
| 8,938,669 B1 | 1/2015 | Cohen |
| 9,020,893 B2 | 4/2015 | Zalpuri et al. |
| 9,047,368 B1 | 6/2015 | Cooley |
| 9,106,687 B1 | 8/2015 | Sawhney et al. |
| 9,208,153 B1 | 12/2015 | Zaveri et al. |
| 9,253,075 B2 | 2/2016 | Jacobson et al. |
| 9,270,446 B2 | 2/2016 | Ayday et al. |
| 9,400,800 B2 | 7/2016 | Jacobson et al. |
| 9,449,182 B1 | 9/2016 | Dang et al. |
| 9,536,047 B2 | 1/2017 | Ayday et al. |
| 9,633,100 B2 | 4/2017 | Kashyap et al. |
| 9,832,195 B2 | 11/2017 | Gillett et al. |
| 9,880,989 B1 | 1/2018 | Cadabam et al. |
| 10,257,196 B2 | 4/2019 | Dang et al. |
| 2001/0042085 A1 | 11/2001 | Peairs et al. |
| 2002/0138529 A1 | 9/2002 | Yang-Stephens et al. |
| 2003/0061221 A1 | 3/2003 | Ito et al. |
| 2003/0074368 A1 | 4/2003 | Schuetze et al. |
| 2004/0068697 A1 | 4/2004 | Hark et al. |
| 2004/0205542 A1 | 10/2004 | Bargeron et al. |
| 2004/0210833 A1 | 10/2004 | Lerner et al. |
| 2004/0230577 A1 | 11/2004 | Kawatani |
| 2004/0267746 A1 | 12/2004 | Marcjan et al. |
| 2005/0010799 A1 | 1/2005 | Kelley et al. |
| 2005/0022106 A1 | 1/2005 | Kawai et al. |
| 2005/0034062 A1 | 2/2005 | Bufkin et al. |
| 2005/0038787 A1 | 2/2005 | Cheung et al. |
| 2005/0044494 A1 | 2/2005 | Barnes et al. |
| 2005/0055306 A1 | 3/2005 | Miller et al. |
| 2005/0160356 A1 | 7/2005 | Albomoz et al. |
| 2005/0240580 A1 | 10/2005 | Zamir et al. |
| 2005/0251675 A1 | 11/2005 | Marcjan et al. |
| 2006/0053365 A1 | 3/2006 | Hollander et al. |
| 2006/0125846 A1 | 6/2006 | Springer et al. |
| 2006/0150079 A1 | 7/2006 | Albornoz et al. |
| 2006/0183462 A1 | 8/2006 | Kolehmainen |
| 2006/0248083 A1 | 11/2006 | Sack et al. |
| 2006/0294311 A1 | 12/2006 | Fu et al. |
| 2007/0011140 A1 | 1/2007 | King et al. |
| 2007/0118795 A1 | 5/2007 | Noyes et al. |
| 2007/0150802 A1 | 6/2007 | Wan et al. |
| 2007/0156732 A1 | 7/2007 | Surendran et al. |
| 2007/0208994 A1 | 9/2007 | Reddel et al. |
| 2007/0271249 A1 | 11/2007 | Cragun et al. |
| 2008/0040342 A1 | 2/2008 | Hust et al. |
| 2008/0052291 A1 | 2/2008 | Bender |
| 2008/0222512 A1 | 9/2008 | Albornoz et al. |
| 2009/0217158 A1 | 8/2009 | Bailey |
| 2009/0260060 A1 | 10/2009 | Smith et al. |
| 2009/0265747 A1 | 10/2009 | Li |
| 2010/0010998 A1 | 1/2010 | Wagner |
| 2010/0030578 A1 | 2/2010 | Siddique et al. |
| 2010/0095203 A1 | 4/2010 | Toebes et al. |
| 2010/0174983 A1 | 7/2010 | Levy et al. |
| 2010/0211781 A1 | 8/2010 | Auradkar et al. |
| 2010/0241668 A1 | 9/2010 | Susanto et al. |
| 2010/0318893 A1 | 12/2010 | Matthews et al. |
| 2010/0325686 A1 | 12/2010 | Davis et al. |
| 2011/0055180 A1 | 3/2011 | Lumley et al. |
| 2011/0078615 A1 | 3/2011 | Bier |
| 2011/0088091 A1 | 4/2011 | Petronijevic et al. |
| 2011/0099152 A1 | 4/2011 | Law et al. |
| 2011/0145593 A1* | 6/2011 | Auradkar ............ G06F 21/6218 713/189 |
| 2011/0153680 A1 | 6/2011 | Rolla et al. |
| 2011/0178981 A1 | 7/2011 | Bowen et al. |
| 2011/0197266 A1 | 8/2011 | Chu et al. |
| 2011/0231222 A1 | 9/2011 | Sharma et al. |
| 2011/0289105 A1 | 11/2011 | Hershowitz |
| 2011/0296517 A1 | 12/2011 | Grigoriev et al. |
| 2011/0302210 A1 | 12/2011 | Comanescu |
| 2011/0320925 A1 | 12/2011 | Piersol et al. |
| 2012/0030553 A1 | 2/2012 | Delpha et al. |
| 2012/0086989 A1 | 4/2012 | Collins et al. |
| 2012/0136936 A1 | 5/2012 | Quintuna |
| 2012/0192086 A1 | 7/2012 | Ghods et al. |
| 2012/0222132 A1 | 8/2012 | Burger et al. |
| 2012/0284605 A1 | 11/2012 | Sitrick et al. |
| 2012/0323968 A1 | 12/2012 | Yih et al. |
| 2013/0013560 A1 | 1/2013 | Goldberg et al. |
| 2013/0061125 A1 | 3/2013 | O'Mara et al. |
| 2013/0104028 A1 | 4/2013 | Murray et al. |
| 2013/0151970 A1* | 6/2013 | Achour ............... H04N 21/854 715/723 |
| 2013/0191451 A1 | 7/2013 | Tse et al. |
| 2013/0219176 A1 | 8/2013 | Akella et al. |
| 2013/0246901 A1 | 9/2013 | Massand |
| 2013/0311420 A1 | 11/2013 | Tehranchi et al. |
| 2014/0026025 A1 | 1/2014 | Smith |
| 2014/0074905 A1 | 3/2014 | Schincariol et al. |
| 2014/0089775 A1 | 3/2014 | Worsley et al. |
| 2014/0101310 A1 | 4/2014 | Savage et al. |

(56) References Cited

U.S. PATENT DOCUMENTS

| | | |
|---|---|---|
| 2014/0115436 A1 | 4/2014 | Beaver et al. |
| 2014/0115450 A1 | 4/2014 | Zhong et al. |
| 2014/0143446 A1 | 5/2014 | Jacobson et al. |
| 2014/0173137 A1 | 6/2014 | Jacobson et al. |
| 2014/0196115 A1 | 7/2014 | Pelykh |
| 2014/0229556 A1 | 8/2014 | Cooper et al. |
| 2014/0250073 A1 | 9/2014 | Zalpuri et al. |
| 2014/0281875 A1 | 9/2014 | Branton et al. |
| 2014/0282921 A1 | 9/2014 | Filman et al. |
| 2014/0351907 A1 | 11/2014 | Noble |
| 2015/0067150 A1 | 3/2015 | Heredia et al. |
| 2015/0106378 A1 | 4/2015 | Clark et al. |
| 2015/0134600 A1 | 5/2015 | Eisner et al. |
| 2015/0169500 A1 | 6/2015 | Balinsky et al. |
| 2015/0199379 A1 | 7/2015 | Thierer et al. |
| 2015/0199416 A1 | 7/2015 | Kashyap et al. |
| 2015/0227514 A1 | 8/2015 | Gillett et al. |
| 2015/0236849 A1 | 8/2015 | Ayday et al. |
| 2016/0156631 A1 | 6/2016 | Viswanathan et al. |
| 2016/0224735 A1 | 8/2016 | Ayday et al. |
| 2018/0004828 A1 | 1/2018 | Kathuria et al. |
| 2018/0004829 A1 | 1/2018 | Kathuria et al. |
| 2018/0097812 A1 | 4/2018 | Gillett et al. |
| 2018/0375730 A1 | 12/2018 | Anand et al. |
| 2019/0014395 A1 | 1/2019 | Anand et al. |

FOREIGN PATENT DOCUMENTS

| | | | |
|---|---|---|---|
| JP | 2003067330 | A | 3/2003 |
| JP | 2005228253 | A | 8/2005 |
| JP | 2007501969 | A | 2/2007 |
| JP | 2009086742 | A | 4/2009 |
| JP | 2010034920 | A | 2/2010 |
| JP | 2011191862 | | 9/2011 |
| JP | 2012209809 | A | 10/2012 |
| KR | 20100080802 | A | 7/2010 |
| KR | 20110000655 | A | 1/2011 |
| KR | 101159504 | B1 | 6/2012 |
| KR | 20140092831 | A | 7/2014 |
| WO | 2009105735 | A2 | 8/2009 |

OTHER PUBLICATIONS

Eppstein et al., "What's the Difference? Efficient Set Reconciliation Without Prior Context?", SIGCOMM '11, Aug. 15-19, 2011, 12 pages.

Extended European Search Report, dated Oct. 27, 2017, European Patent Application No. 14859862.6, filed Nov. 10, 2014, 12 pages.

International Search Report and Written Opinion dated Aug. 28, 2015, International Patent Application No. PCT/US2015/014911, filed Feb. 6, 2015.

International Search Report and Written Opinion dated Mar. 31, 2015, International Patent Application No. PCT/US2014/064875, filed Nov. 10, 2014.

Japanese Final Rejection dated Mar. 26, 2018, Patent Application No. 2016-528236, filed Nov. 10, 2014, 4 pages.

Kong et al., "Graphical Overlays: Using Layered Elements to Aid Chart Reading," IEEE Transactions on Visualization and Computer Graphics 18(21): 2631-2638, published online Oct. 9, 2012, print publication Dec. 1, 2012.

Korean Decision of Patent Grant dated Oct. 2, 2017, Patent Application No. 10-2016-7015415, filed Nov. 10, 2014, four pages.

Canadian Office Action dated Jun. 28, 2018, Patent Application No. 2930415, filed Nov. 10, 2014, 4 pages.

Canadian Office Action dated Jun. 4, 2019, Patent Application No. 2930415, filed Nov. 10, 2014, 3 pages.

Chinese First Office Action dated Dec. 3, 2018, Patent Application No. 201480072858.7, filed Nov. 10, 2014, 8 pages.

Chinese Notice of Grant dated Oct. 9, 2019, Patent Application No. 201480072858.7, filed Nov. 10, 2014, 4 pages.

Chinese Second Office Action dated Jun. 18, 2019, Patent Application No. 201480072858.7, filed Nov. 10, 2014, 3 pages.

Doi et al., "A proposal of an Annotation System CollabSticky Focused on Collecting Comments in Presentation," Information Processing Society of Japan 2007(1):159-164, Jul. 2007.

Einziger et al., "TinySet—An Access Efficient Self Adjusting Bloom Filter Construction," IEEE/ACM Transactions on Networking 25(4):2295-2307, Aug. 2017.

Eppstein et al., "Straggler identification in round-trip data streams via Newton's identities and invertible Bloom filters," IEEE Transactions on Knowledge and Data Engineering 23(2)297-306, Aug. 19, 2010.

European Communication under Rule 71(3) EPC dated Jun. 7, 2019, Patent Application No. 14859862.6, filed Nov. 10, 2014, 48 pages.

Extended European Search Report dated Jan. 24, 2020, Patent Application No. 19204178.8, filed Nov. 10, 2014, 9 pages.

Fujita et al., "Comprehensive Manual for Editing and Publishing Books for Amazon Kindle (p. 162)," MD Corporation, Inc., Jul. 21, 2013, 4 pages.

Goodrich et al., "Invertible Bloom Lookup Tables," 49th Annual Allerton Conference on Communication, Control, and Computing, Sep. 28, 2011, 24 pages.

He et al, "RIDEE-SPS: Presentation System for Realtime Interactive Distance Education Environment," Information Processing Society of Japan 44(3):700-708, Mar. 15, 2003.

Japanese Appeal Decision dated Oct. 28, 2019, Patent Application No. 2016-528236, filed Nov. 10, 2014, 23 pages.

Japanese Final Rejection dated Mar. 4, 2019, Patent Application No. 2018-138930, filed Nov. 10, 2014, 3 pages.

Japanese First Office Action dated Oct. 15, 2018, Patent Application No. 2018-138930, filed Nov. 10, 2014, 4 pages.

Japanese Office Action dated Mar. 25, 2019, Patent Application No. 2016-528236, filed Nov. 10, 2014, 17 pages.

Singaporean Notice of Eligibility for Grant and Supplementary Examination Report dated Dec. 24, 2018, Patent Application No. 11201603644X, filed Nov. 10, 2014, 3 pages.

Nikipedia, "Portable Document Format," May 4, 2011 (retrieved Jun. 13, 2019), https://web.archive.org/web/20110504202116/http://en.wikipedia.org/wiki/Pdf#Annotating_PDFs, 21 pages.

* cited by examiner

DEVELOPER BASED DOCUMENT COLLABORATION

CROSS-REFERENCE TO RELATED APPLICATIONS

This application is a continuation of U.S. patent application Ser. No. 14/175,870, filed Feb. 7, 2014, entitled "DEVELOPER BASED DOCUMENT COLLABORATION," the disclosure of which is hereby incorporated herein in its entirety. This application also incorporates by reference for all purposes the full disclosure of co-pending U.S. patent application Ser. No. 14/077,204, filed on Nov. 11, 2013, entitled "DOCUMENT MANAGEMENT AND COLLABORATION SYSTEM."

BACKGROUND

The use of remote computing services, such as remote document storage, has greatly increased in recent years. An organization, for example, may support its operations using both internal networks of computing resources and computing resources managed by others. Computers of the organization, for instance, may communicate with computers of other organizations to access and/or provide documents or other data while using services of another organization. In many instances, organizations configure and operate remote networks using hardware managed by other organizations, thereby reducing infrastructure costs and achieving other advantages. With such configurations of computing resources, ensuring that access to the resources and the data they hold can be challenging, especially given the multitude of different computing systems. For example, computers of the organization may include personal computers, tablets, smartphones, laptops and other devices.

Furthermore, ensuring that the documents and other data are displayed uniformly cross-platform is challenging given the variety of hardware and software components of different devices. In addition to displaying documents and other data across a variety of platforms in a uniform manner, there are challenges in allowing users of the organization to edit and collaborate with others when accessing or editing the documents or other data on various devices.

BRIEF DESCRIPTION OF THE DRAWINGS

Various embodiments in accordance with the present disclosure will be described with reference to the drawings, in which.

DETAILED DESCRIPTION

Figure 1:
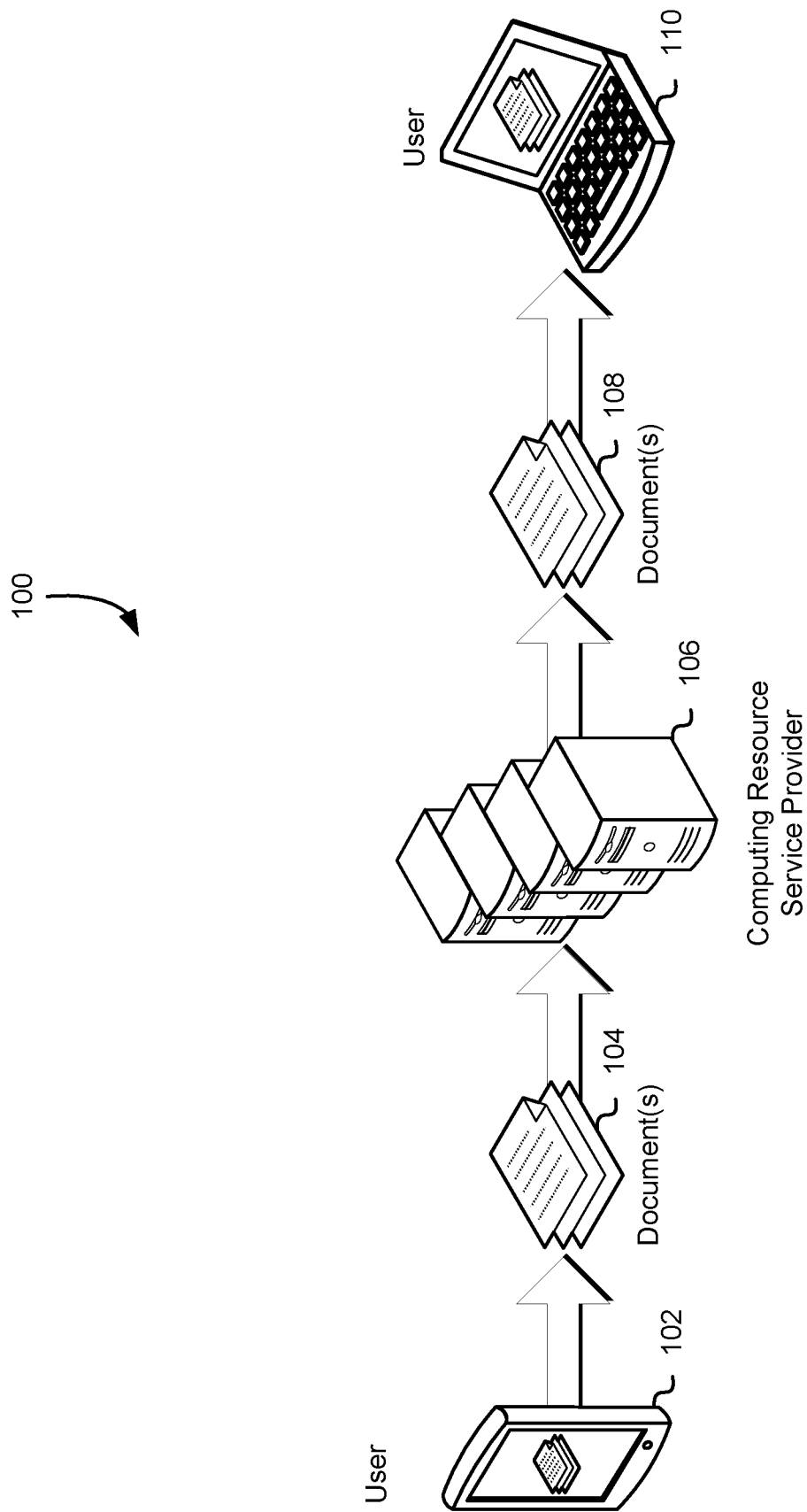
FIG. 1 shows a diagram illustrating various aspects of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to enhancements for document management and document collaboration systems. The computer resource service provider (also referred to simply as a service provider) may operate a document management and collaboration system to enable document collaboration between users of an organization. The document management and collaboration system may be enhanced by converting documents into a universal file format, such as portable document format (PDF), and allowing users to generate annotations or comments for selected words and phrases in the document. Furthermore, the document management and collaboration system may be extended to allow third party developers the ability to interact with the document management and collaboration system and provide additional features and/or enhancements. For example, the service provider may expose an application programming interface (API) to developers and receive API calls from developer's systems enabling the developer's systems to interact with the document management and collaboration system. The API calls may enable developers to store, manage and collaborate on documents using the document management and collaboration system.

Using the exposed API developers may add additional features to the document management and collaboration system. For example, a particular developer may generate a unique file format and through the use of the document management and collaboration system API the developer may offer the ability to collaborate on documents in the unique file format to users of an organization. Furthermore, the developer may convert documents in the unique file format to PDF before calling the document management and collaboration system API. In another example, the developers may add features to the document management and collaboration system. The features may include the ability to add pictures or other media to documents in the document management and collaboration system. The features may also include the ability to interact with the document in a particular manner, such as the ability to make edits with the appearance of having been made with a red marker. The developers may include the interactions in the document or the interactions may be stored in a separate file associated with the document. The document may be transmitted by the developers to the document management and collaboration system for storage, management and collaboration with users. The document management and collaboration system may convert the document a universal file format or may receive the document from the developers in a universal file format.

The document in universal file format may also be referred to as an underlay. Furthermore, if the document in PDF format (either natively or once it has been converted) is above a certain size it may be compressed, split into one or more documents, converted to another file format, the resolution of the document may be lowered or any other suitable technique for reducing the document's size may be used before the coordinate map is generated based at least in part on the document. In various embodiments, users may transmit documents to remote computing resources operated by a computing resource service provider. The service provider may, if the document is not already in a universal file format, convert the document to a universal file format. For example, a user may create a document on a computer system of an organization and transmit the document to the service provider to enable remote storage of the document and collaboration on the document with other users of the organization. The service provider may then convert the document into a PDF version using one or more services or systems of the service provider. The service provider may then create a coordinate map based at least in part on the document in PDF format and the Cartesian (or other) coordinate system of the PDF file format. The generated coordinate map (also referred to as an annotation index) may be used for displaying user selections and annotations in the uploaded document. In various embodiments, the coordinate map may be a separate file from the document or may be included as information in the document. For example, the coordinate map may be stored in the document converted to the universal file format.

Users of the organization may request document(s) from the service provider using one or more computing devices, such as a tablet, smartphone, laptop, desktop, electronic book reader, workstation or any other suitable computing device. The service provider may then, as a result of the request, transmit the document, the generated coordinate map and any other data associated with the document to the computing device from which the user transmitted the request. The coordinate map may include one or more files generated from the document in the universal file format indicating the position of each word in the document or may be included in the document once it has been converted to the appropriate file format. The PDF file format contains a device independent coordinate system that may be used to display the PDF file. The coordinate map may be stored in the same remote storage systems as the document or in one or more other remote storage systems. In various embodiments, other data associated with the document includes comments, annotations or selections made by one or more users. Other data associated with the document may be combined into a single file (also referred to as an overlay) for use in displaying collaboration between users.

Once received by the computing device of the user, the computing device may display the document and the other data associated with the document based at least in part on the overlay, the coordinate map and the underlay. For example, the coordinate map may provide the coordinates for each word in the document and the overlay may provide the annotations to the documents created by various users and the location of the annotations relative to the coordinates of the words in the coordinate map. The user may then collaborate on the document, such as by making selections and providing annotations to the document displayed to the user. The user's interactions with the document may be captured by the computing device and stored locally until the user submits the document to the service provider for remote storage. For example, the user may select a group of words from the document using a cursor controlled by a pointing device, such as a mouse. Once the user has made a selection and the computing device has determined that the user has completed the selection, the user may be prompted to perform one or more other actions, such as providing a comment or selecting a highlighted function. The selection of words and actions performed by the user may be stored locally and the computing device may capture one or more other user interactions with the document. Once the user has completed collaboration on the document, the user may submit the document to the service provider for storage by selecting the submit operation. The computing device may then execute a batch job which transmits the locally saved user interactions to the service provider.

The batch job may include the underlay, the coordinate map and overlay along with the saved user interactions. Once received by the service provider, the service provider may store the document as a new version and update data corresponding to the document information. For example, the service provider may update the version information corresponding to the document. Saving each newly uploaded document as a new version of the document may include determining if any changes were made to the document, generating new underlays and overlays for the document, updating one or more search indexes corresponding to the document and notifying collaborators and owners of the document that a new version has been uploaded. Furthermore, local versions of the document may be preserved such that changes made to the document stored remotely will not be reflected in the local documents until the user has uploaded their local files and updated the local client. The user may also select a previous version of the document to roll back to. Each new version of the document may be assigned a new version identification number but retain that same document identification number. Saving each newly submitted document as a new version of the same document and preserving local files until they are submitted facilitates collaboration on the document without the need to use other files to manage conflicts between document versions.

In various embodiments, the saved user interactions include location coordinates for the words selected by the user and annotations associated with the location coordinates. This information may be stored separately as a new version of the overlay in a storage system maintained by the service provider, or may overwrite a previously stored version of the overlay or may be stored in the document itself. One or more databases may be used to record information corresponding to the underlay, coordinate map and overlay and the database may also contain the location of the underlay, coordinate map and overlay.

The coordinate map, overlay and other information generated based at least in part on various users' interaction with the document may be used to insert or add information to the document. For example, a user may select a portion of text in the document and associate a comment with the selected portion of text. The selection of text and associated comment may be stored by the service provider and may be inserted as a selection of text and associated comment into a version of the document. Annotations and/or comments generated by the users may also be inserted inline as text directly into the document or into a new version of the document. The document or new version of the document may then be processed by the service provider in order to generate a new underlay and coordinate map for the document. The annotations and/or comments generated by the users may be inserted or added to the document automatically once the overlay and other information has been received by the service provider or an author (also referred to as an owner) of the document may receive an indication that annotations and/or comments have been received and the author may select particular annotations and/or comments to insert into the document.

One or more applications causing the document to the displayed to the users may indicate to the user that the user's interactions with the document are being saved directly to the document. The one or more applications may then store the user's interactions with the document in the overlay and transmit the overlay to the service provider. The service provider may then insert information into the document based at least in part on the user's interactions with the document stored in the overlay. The service provider may also provide the users with access to one or more previous versions of the document such that the users can view one or more changes between different versions of the document. Furthermore, comments or other changes made to a particular version of the document may be requested by the users and the service provider may, in response to the request, provide the comments or other changes made in the document format the document was in when uploaded by the user responsible for uploading the document or some other format.

When the users publish a comment and/or annotation or the author accepts a comment and/or annotation, the service provider may receive an indication to insert the comment and/or annotation into the document. For example, the author of a document may access the document including comments and annotations using a single-page application (SPA) website operated by the service provider and select at least a portion of the comments and annotations to be inserted into the document. The SPA website may then transmit a request to one or more services of the service provider to insert the comments and annotations selected by the author. In another example, the service provider may automatically insert all comments and annotations published by users authorized to collaborate on the document. The service provider or one or more services of the service provider may then receive the comment and/or annotation as an overlay associated with the document and retrieve the associated document. The service provider may, using one or more software libraries corresponding to the document format, extract the comment and/or annotation from the overlay and insert the comment and/or annotation into the document based at least in part on the coordinate map and information contained in the overlay. The document generated from inserting the comment and/or annotation may be stored by the service provider, and the document may also be processed in order to generate a new underlay and coordinate map. The new underlay and coordinate map may enable other users to interact with the document.

The user's documents, including the underlay and overlay corresponding to the documents, may be processed by one or more systems or services of the service provider to enable document collaboration between different users on different devices in a homogenous manner across a variety of different software and hardware architectures. The service provider may convert all the documents to a document format which uses a device independent coordinate system to describe the surface of a page in the document. The documents may then be processed by the service provider as a stream of text in order to determine the location coordinates of each character. Each character's location may be determined by creating a bounding box around the characters. The service provider may then determine a bounding box for each line of the document. Based at least in part on the line bounding boxes and the character bounding boxes, the service provider may determine bounding boxes for the words in the document. Determining the bounding boxes for all the words in the document allows for selected text comments and annotations to be displayed in a uniform way across multiple different devices. The service provider processing normalizes the documents so that they can be displayed in an identical manner across a variety of different platforms and avoid loading on the computing devices of the user. The coordinate map enables consistent display of the information contained in the overlay across multiple computing devices with different display characteristics, such as different resolutions, different display sizes, different aspect ratios and any other differences between the displays of the multiple devices. When used by the computing device to display the document, the coordinate causes the annotations to be displayed in connection with the same words regardless of the display characteristics of a particular display that displays the overlay and document.

A variety of third party developer (also referred to simply as a developer) may interface with the document management and collaboration system in order to utilize one or more features and capabilities of the document management and collaboration system. Developers may provide a variety of goods and service to customer and communicate with the document management and collaboration system in order to enable customer of the developer to access the document management and collaboration system. For example, the developer may offer an application configured to interface with the document management and collaboration system and enable customer using the application to access the document management and collaboration system features. Developers may also offer a component or add-in to the document management and collaboration system. For example, the developer may offer a specific file format generated by the developer that can be used with the document management and collaboration system thereby enabling customers of the developer to receive collaboration on a document in the specific file format generated by the developer. The developer may use one or more API calls or a software development kit (SDK) to communicate and otherwise interface with the document management and collaboration system. The document management and collaboration system API may use a representational state transfer (REST) protocol in order to enable developers to generate API calls configured to communicate with the document management and collaboration system.

The developer may use the API to transmit documents to the document management and collaboration system to be saved with the document management and collaboration system. The developer may also use the API to retrieve documents from the document management and collaboration or cause the document management and collaboration system to perform one or more operations on documents. For example, the developer may transmit and API request to the document management and collaboration system that causes the document management and collaboration system to insert text or images into documents. The developer may create or edit all or a portion of the data used by the document management and collaboration system. For example, the developer may generate the underlay to be used by the document management and collaboration system for a particular document or document type. In another example, the developer may generate the overlay corresponding to a document.

FIG. 1 shows an illustrative example of an aspect of a document collaboration system in accordance with the present disclosure. Accordingly, FIG. 1 shows environment 100 which illustrates an example of a customer operating a computing device 102, such as a smartphone or tablet. During operation of the computing device 102 a user may interact with the computing device and cause operations on one or more documents and/or the creation of one or more documents. The documents and operations performed by the user may be saved locally on the computing device 102. The computing device may then, as a result of a request by the user, transmit the document(s) 104 to one or more systems 106 of the computing resource service provider. The one or more systems 106 of the service provider may be used by the service provider to provide services and resources. The documents 104 may be newly created documents by the user on the computing device 102 or the documents may be new versions of already existing documents which the user has collaborated on. The computing device 102 may transmit, to the service provider, the document and other data corresponding to the document such as metadata, user data, version data, underlay, overlay, comments, annotations, document identification information, coordinate map or any other data suitable for document collaboration.

Once received by the service provider, various systems 106 of the service provider may process the documents. For example, a system of the service provider may update a database with information corresponding to the document. Various other files may be created by one or more systems of the service provider such as the overlay, the coordinate map and the underlay. In various embodiments, the received documents 104 are converted to a universal file format (referred to as the underlay) from which the coordinate map may be created. File formats may include portable document format (PDF), an image file or any file format capable of identical display across different computing devices. The service provider may also generate an overlay based on the data submitted with the document. The underlay and the coordinate map may be used to uniformly display annotations and other information in the documents on other computing devices. One or more systems 106 of the service provider may store the original documents, the converted document, the coordinate map generated from the converted document, the overlay created and any other data corresponding to the document. Other data may include version history, permission, requests and any other data suitable for document collaboration.

Another user may request, from computing device 110, one or more documents 108 from the service provider. In various embodiments, documents 108 are the same as documents 104 transmitted from computing device 102. Computing device 110 may send a request to a system 106 of the service provider. The service provider may determine the document identifier from the submitted request and query a database to determine the location of the requested document and the corresponding files. The document identifier may be a globally unique identifier for a document which may be separate from a version identifier which may identify a particular version of the document. The corresponding files may include the coordinate map, overlay and any metadata associated with the documents. The service provider may collect the files and transmit the collected files to the computing device 110. In various embodiments, the service provider transmits the location of the files to the computing device 110 and the computing device requests the documents directly from the location transmitted.

In various embodiments, the user interacts with documents 104 on computing device 102. The interactions are stored in the overlay associated with documents 104 and transmitted to the system 106 of the service provider. The service provider then inserts the user's interactions stored in the overlay into the documents and creates new versions of the documents 108. The documents 108 containing the user interactions may be processed to generate a new underlay and coordinate map such that when the documents 108 are displayed by computing device 110 the display contains the user's interaction performed using computing device 102. The documents 108 transmitted to computing device 110 may include a new overlay associated with documents 108 or the computing device 110 may generate a new overlay upon receipt of the documents 108. The new overlay may enable user's interactions with the documents 108 to be captured and stored by computing device 110.

Once the computing device 110 has received the documents 108 and corresponding files, the documents may be displayed in such a way that when displayed on computing device 110, the documents appear the same as when displayed on computing device 102. For example, the service provider may transmit the overlay, underlay, the coordinate map and the corresponding metadata. The computing device 110 may use the coordinate map to determine where to draw the annotations stored in the overlay, such that they appear in the same place as the annotations appeared in the document when displayed by computing device 102. Various devices may display the images differently due to different screen sizes and resolutions, but the determination of where to draw the annotations is based on a device independent coordinate system and is not affected by differences in devices. If the service provider has inserted the information from the overlay into the document, the document may be displayed on computing device 110.

Figure 2:
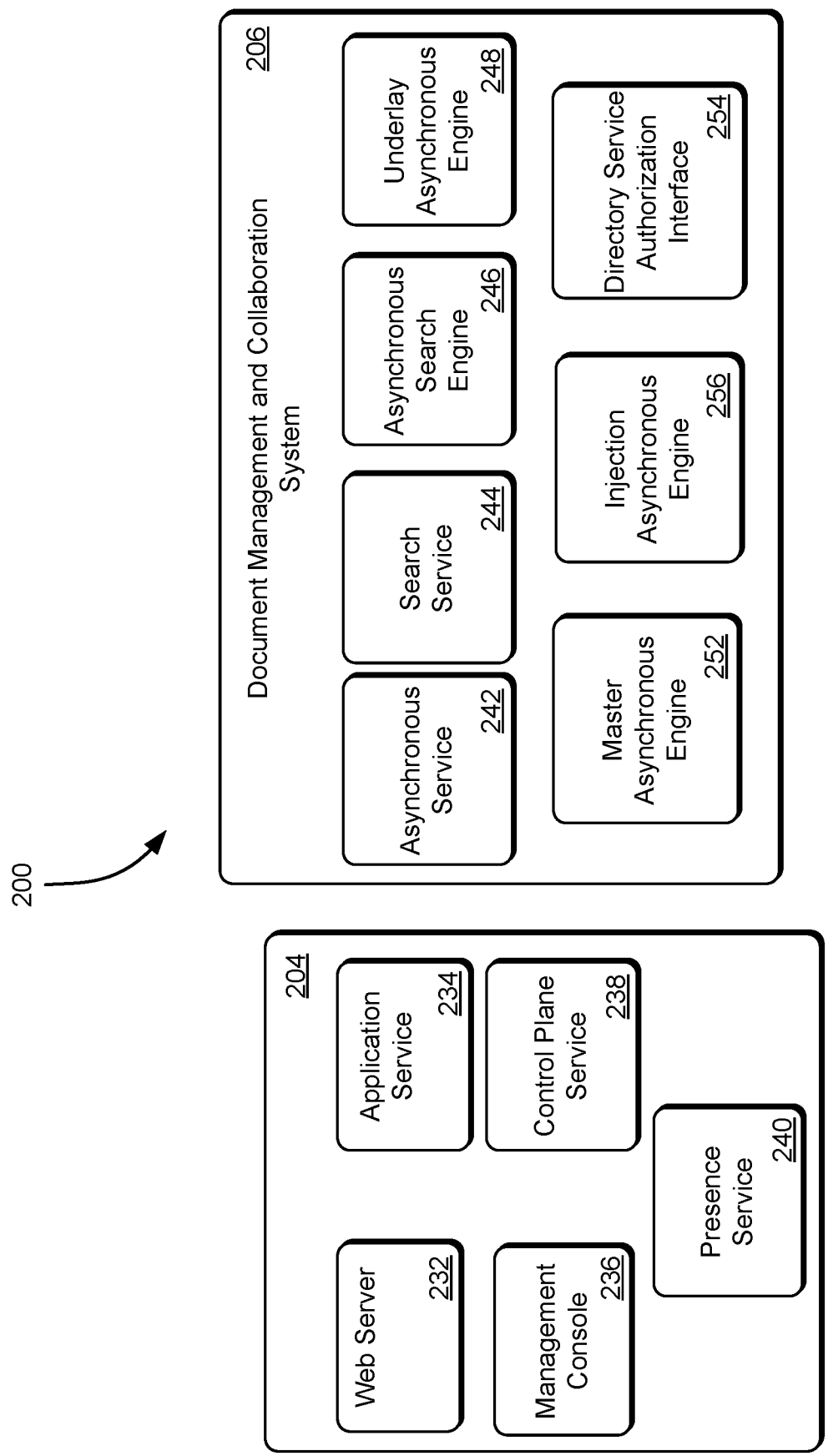
FIG. 2 shows an illustrative example of an environment in which various embodiments of the present disclosure may be practiced.

FIG. 2 shows environment 200 which illustrates an example of the functional entities of the front-end system and the document management and collaboration system in accordance with at least one embodiment. The front-end system 204 includes a web server 232, an application service 234, a management console 236, control plane service 238 and a presence service 240. The web server 232 may be a collection of computing resources collectively configured to enable the execution of a website, a single-page web application or a single-page interface that permits a user to transmit or upload documents to the document management and collaboration system 206 and manage the documents. The web server may further enable the user to view and edit documents, underlays or overlays or particular portions of the documents, underlays or overlays. The web server may also enable the user to provide commentary or feedback on the documents, underlays or overlays. The web server 232 may also enable an administrator or a user to set permissions or share modes that specify the privileges given to a user in accessing documents. In addition, the web server may enable users or devices to submit authentication credentials. The content distribution edge network may be used to distribute content of the web server 232. The actions performed by the user may be done via a website, an application or a management console and the web server 232 may enable executing the website, application or management console. Although one web server 232 is described with reference to FIG. 2 it may be contemplated that multiple web servers of any type may be used, whereby a portion of the web servers may be redundant.

The application service 234 may be a collection of computing devices and other resources collectively configured to serve as a user-exposed service that receives requests from the user and services the requests. A user request may be made using a website or a management console accessible to the user or a client that is executed on a user's device and may make service requests on behalf of the user. The request may be an API function call and the application service 234 may process the request and manage its execution. The application service 234 may cause the synchronous execution of actions associated with a received request or alternatively may cause one or more actions that require more complex processing to be queued for asynchronous execution. The application service 234 may also be responsible for receiving user credentials and request authentication of the user from an authentication service. To cause the performance of operations requested by the user, the application service 234 may make one or more function calls to services or entities of the computing resource service provider. For example, the application service 234 may request user or access token validation from the managed directory service or may cause search indices maintained by the search service 244 to be updated. The application service 234 may also receive API requests or other requests from the developer and cause execution of the requests by one or more systems or services of the document management and collaboration system 206.

The management console 236 may be a collection of computing devices and other resources collectively configured to permit organizations, administrators and users to register for utilizing document management and collaboration services. The management console 236 may be used in addition or as an alternative to a website or an application running on a user device and may permit users and administrators to make service requests using appropriately configured API function calls. For example, the management console 236 may be used for inviting a user to join a document collaboration system and view and collaborate on documents. Further, the management console 236 may be used for allowing dashboard access, audit log access, permission setting (for example, for administrators and user), storage limit setting (for example, for organizations and users) and security setting (for example, password and encryption). The control plane service 238 of the front-end system 204 may be a collection of computing devices and other resources collectively configured to serve as an interface that enables creating new computing instances for document collaboration and management.

The presence service 240 of the front-end system 204 may be a collection of computing devices and other resources collectively configured to provide information to users near contemporaneously with the generation of the information. The presence service 240 may communicate with one or more services of the document management and collaboration system 206 in order to provide information to one or more users. The presence service 240 may implement a Web Socket or other protocol to enable users of the document management and collaboration system 206 to receive updates to documents managed by the document management and collaboration system 206. The presence service 240 may provide a bi-directional communications channel between single-page web application or client application operated by the user and the web server 232 or one or more other services of the document management and collaboration system 206. For example, multiple users may edit a document simultaneously, such as during a meeting, the presence service 240 may receive updates to the document corresponding to users' interaction with the document through the particular user's client application. The presence service 240 may the transmit information corresponding to the users' interaction to at least one of the multiple users editing the document simultaneously such that at least one users received real-time updates to the document.

The document management and collaboration system 206 includes an asynchronous service 242, a search service 244, an asynchronous search engine 246, an underlay asynchronous engine 248, a master asynchronous engine 252, injection asynchronous engine 256 and a directory service authorization interface 254. The asynchronous service 242 may be a collection of computing devices and other resources collectively configured to manage the execution of asynchronous workflows. The asynchronous service 242 may include or be connected to a queue that stores asynchronous events for execution. The asynchronous service 242 may coordinate the execution of asynchronous workflows with the master asynchronous engine 252, which may be responsible for scheduling activities associated with the workflow. The activities may include underlay generation, text extraction and text insertion. As described herein, the execution of workflow activities or tasks may be performed by engines or workers. For example, the asynchronous search engine 246 may be tasked with performing text extraction activities and the underlay asynchronous engine 248 may be tasked with performing activities associated with underlay creation. Furthermore, the injection asynchronous engine 256 may be tasked with injecting annotations and comments into documents managed by the document management and collaboration system 206.

The injection asynchronous engine 256 may be a collection of computing resources collectively configured to insert annotations and/or comments into documents. The injection asynchronous engine 256 may receive published comments and annotations and retrieve a copy document associated with the published comments and annotations. The document may be in the document format as uploaded by the user responsible for the document or in another format. The injection asynchronous engine 256 may then inject the annotations and comments into the document based at least in part on information contained in the overlay associated with the document. For example, the overlay may contain the coordinates for the starting position and ending position for the in-line insertion of a particular annotation. The injection asynchronous engine 256 may then insert the particular annotation into the document using the coordinates for the starting position and the end position. Once the injection asynchronous engine 256 completed injection of the received published comments and annotations, the injection asynchronous engine 256 may cause the document to be saved in the object-level data storage service and enable one or more users associated with the document to access the document. Furthermore, the injection asynchronous engine 256 may cause one or more other asynchronous workflows to be initiated or queued. For example, after injection comments and annotations into a document, the injection asynchronous engine 256 may cause the document to be queued with the asynchronous service 242 in order to generate an underlay for the document and update the search service 244.

In the course of executing asynchronous workflows, the asynchronous search engine 246, the underlay asynchronous engine 248, and the injection asynchronous engine 256 may obtain or download documents or files from the object-level data storage service and cause documents or files to be stored in the object-level data storage service. Further, the engines may generate documents of any file type based on received documents, perform text extraction, text injection and store annotations. In addition, the asynchronous search engine 246 may place search index updates associated with document in a queue for processing by the search service 244. The updates may be associated with search indices maintained by the search service. The search service may be utilized for maintaining a search index of customer documents and their associated metadata. Further, to ensure consistent performance the searchable metadata or customer documents may be replicated to ensure consistent performance and guard against outages.

The search service 244 may be a collection of computing devices and other resources collectively configured to perform batch processing on the search index updates in the queue and launch a workflow for performing search index update activities. Upon launching the workflow, the asynchronous search engine 246 causes search indices to be updated in the search service 244. The directory service authorization interface 254 enables the document management and collaboration system 206 to delegate user authentication to another entity such as the managed directory service. The document management and collaboration system 206 may submit user access tokens to the authenticating party via the directory service authorization interface 254 and may receive a response indicating whether a user may be authenticated.

Figure 3:
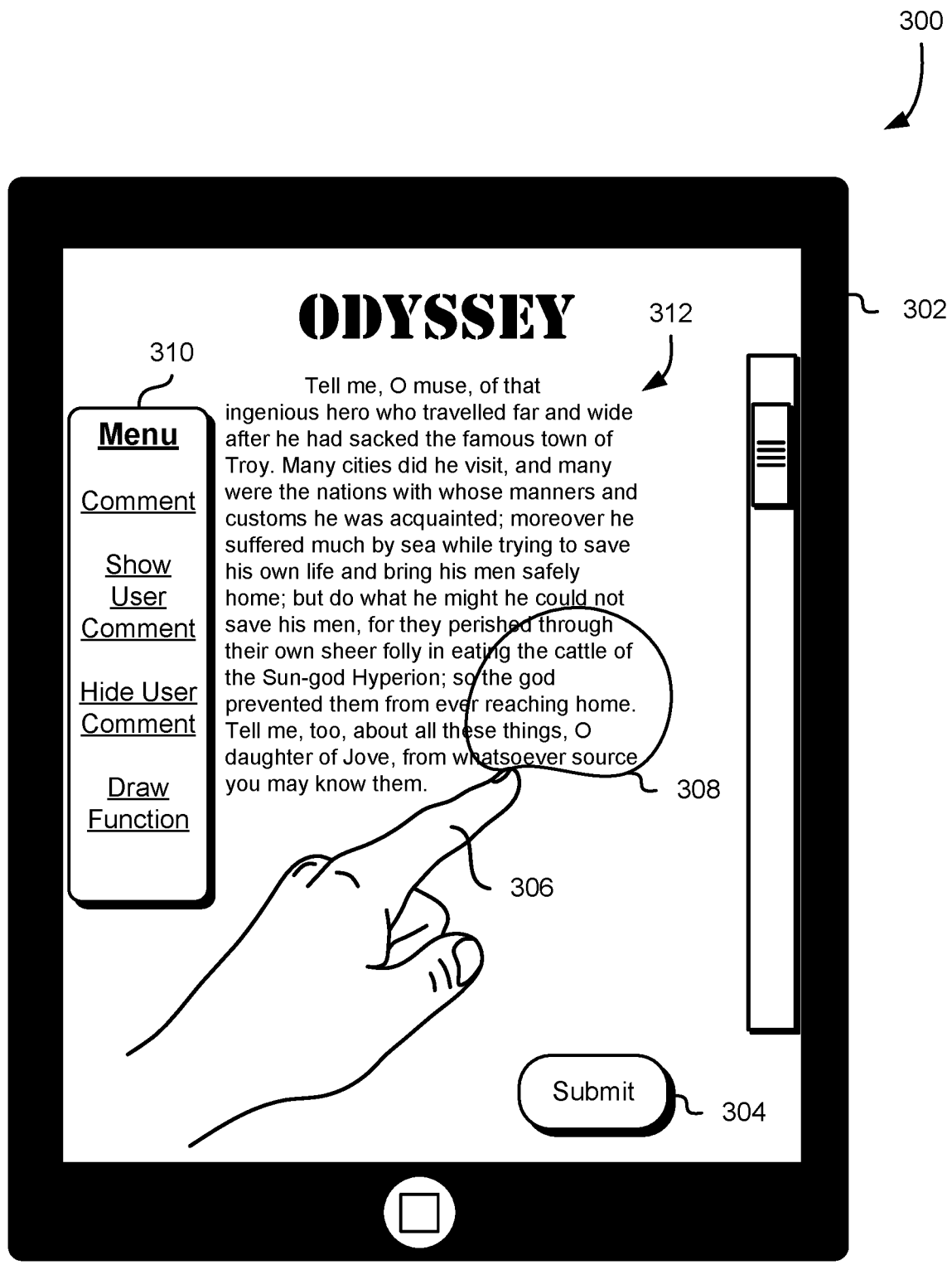
FIG. 3 shows a diagram illustrating a client application in accordance with various aspects of the present disclosure.

FIG. 3 is an illustrative example of a client application 300 which may be used to view, edit and create documents for use with the document management and collaboration system operated by the service provider. The client application may be executed by a computing device 302 such as the computing devices described above with reference to FIG. 1. Returning to FIG. 3, the client application 300 may be responsible for displaying documents, capturing user interactions with the documents, transmitting documents and corresponding information to one or more systems of the service provider, maintaining local copies of documents and corresponding information, retrieving documents and corresponding information from one or more systems of the service provider, synchronizing local documents with documents stored remotely from the device by the service provider and any other operation suitable for enabling document management and collaboration. The client application 300 may be part of a developer application providing services, access or components to the document management and collaboration system.

The content illustrated in the client application 300 is illustrative in nature and the type and appearance and amounts of content may vary in accordance with various embodiments. The client application 300 may be provided in various ways in accordance with various embodiments. For example, the client application 300 may be provided over a network to the computing device 302 such as an application browser of the computing device.

As illustrated in FIG. 3, the client application 300 includes various graphical user interface elements that enable navigation throughout the document management and collaboration system of which the document 312 is a part, as well as provide functionality developers by one or more developers. In this example, the client application 300 is part of an enterprise level document management and collaboration system including various interfaces for creating, editing and collaborating on various documents. For instance, on the left-hand side of the client application 300 various menu options 310 are provided, allowing actions to be performed on various documents. The menu options 310 may include a variety of options generated by developers such as the "Draw Functions" shown in FIG. 3. In this example, the links appear as textual words which enable the menu options 310 to be selected using an appropriate input device such as a keyboard, mouse, touchscreen, or other input device. Selection of a menu option 310 may cause the client application 300 to execute one or more instructions stored in the memory of the computing device 302 causing performance of the selected menu option. For example, the user may select menu option 310 "Show User Comment," and this selection by the user may cause the computing device 302 to display a list of users that have provided comments to the document 312. Using the appropriate input device, one or more users may be selected from the list and the highlighted words and associated comments are then displayed. In this way, the client application 300 may display all or a portion of the comments and annotations in a document.

Client application 300 may also be used to insert features or components provide by one or more developers into the document 312. The component provided by the one or more developers illustrated in the client application 300 is illustrative in nature and the type and appearance and amounts of components may vary in accordance with various embodiments. Returning to FIG. 3, the component illustrated provides the user the ability to draw a figure 308 on the document 312 using a finger 306 and an input device, such as a touchscreen. Other input devices can be used such as a pointing device, stylus, camera or system of cameras, motion detector or other device capable of capturing the user input. The figure 308 may include any figure the user may drawing including handwriting. The client application 300 may receive the figure 308 from the appropriate input device and cause information corresponding to the figure 308 to be stored in the overlay associated with the document. For example, the figure 308 may be receive by the client application and stored as a graphical element in the overlay. The graphical element may include one or more image files or information corresponding to displaying figure 308. Furthermore client application may receive screen coordinates corresponding to figure 308 and convert the screen coordinate in to document coordinate for use with the overlay and the document management and collaboration system.

A user of the computing device 302 may receive a request from another user to collaborate on a document. The request may be received by client application 300 and the corresponding document and associated data may be retrieved by the client application 300 from a remote storage system operated by the service provider such as the storage system. The client application 300 may also be used to browse or view documents stored on the remote storage system of the service provider. Documents stored by the service provider may have one or more associated permissions, the permissions may control not only access to the document by particular users but also what documents are visible to a particular user when browsing via the client application 300. In this manner a user may search for and select a document for editing. In various embodiments, the client application 300 provides a search option for the user. The user may then enter a keyword or other information and search the documents stored in the storage system operated by the service provider. Once the user has determined a document for editing, the one or more systems of the service provider may determine a location of the document and associated data and transmit the location information to the client application 300. The one or more systems of the service provider may also transmit the documents and associated data directly to the client application 300.

The client application 300 may display the document 312 using the data retrieved from the remote storage system including the underlay, coordinate map and overlay. In various embodiments, the underlay contains the document converted into the universal format with a device independent coordinate system used for displaying the document and the overlay contains the coordinates of user-selected text and associated annotations. Using this information and information contained in the coordinate map, the computing device 302 determines which coordinates to use when drawing the figure 308. Furthermore, the overlay or other data associated with the document may contain information corresponding to comments and annotations inserted by one or more users into the document 312 and a particular document version when the comments, annotations or developer components where inserted into the document. For example, figure 308 may have been inserted or removed by a particular user in a previous version of document 312. The user of computing device 302 may cause application 300 to display figure 308 or information corresponding to figure 308 by selection an option from the menu options 310.

The author or owner (or a group of authors or owners) of the document 312 may select comments and annotations to include or exclude from the document or a particular version of the document. The author of the document may receive a notification that one or more collaborators have provided annotations, comments, developer components or other interaction with the document to the document management and collaboration system. The author may have requested collaboration on the document from the one or more collaborators or the document management and collaboration system may have selected the one or more collaborators on behalf of the author. The author may then review the one or more collaborators' interactions with the document 312 through the client application 300. By selecting the appropriate option in the menu options 310 the author may accept or remove user interactions with the document 312. If the author accepts one or more interactions with the document, the document management and collaboration system may cause the one or more interactions with the document to be injected into the document. For example, if the author accepts figure 308 the document management and collaboration system may insert figure 308 and generate a new underlay and coordinate map based at least in part on the document with figure 308 inserted.

The user may then continue to interact with the document and enter more annotations as described above. The user may scroll down using a scroll bar or some other input method. The user may also zoom in or zoom out of the document 312. This may cause the client application 300 to redraw the document 312. Redrawing the document may change the size and amount of text shown on the screen, but does not affect the coordinates of the word bounding boxes in the coordinate map. The user may also request a copy of all or a portion of the document 312 or the interactions with the document 312. For example, the user may request all of the comments in the document and the document management and collaboration system retrieve the comments stored in the overlay, convert the comments to the document format of the document 312 or some other format and transmit the comments to the user.

In this example, the client application 300 also includes a graphical user element configured as a submit button 304. The submit button 304 may be a graphical user interface element of the client application 300 where the underlying code of the client application 300 is configured such that selection by an input device of the submit button 304 causes information corresponding to the document and/or user interaction with the document to be transmitted to the service provider for remote storage or the developer for further processing. The client application 300 may transmit the document, the underlay, coordinate map overlay, a hash of the files transmitted, document identification information, user authentication information and any other information suited for document collaboration. The developer may generate one or more API calls based on the information transmitted from the client application 300. The one or more API calls may cause the document management and collaboration system to perform one or more operations. For example, the developer may generate, based at least in part on the information transmitted from the client application 300, an API call that causes the document management and collaboration system to save document 312 and the overlay containing figure 308 and publish the document 312 such that one or more other users can access the document 312 and the overlay containing figure 308.

Figure 4:
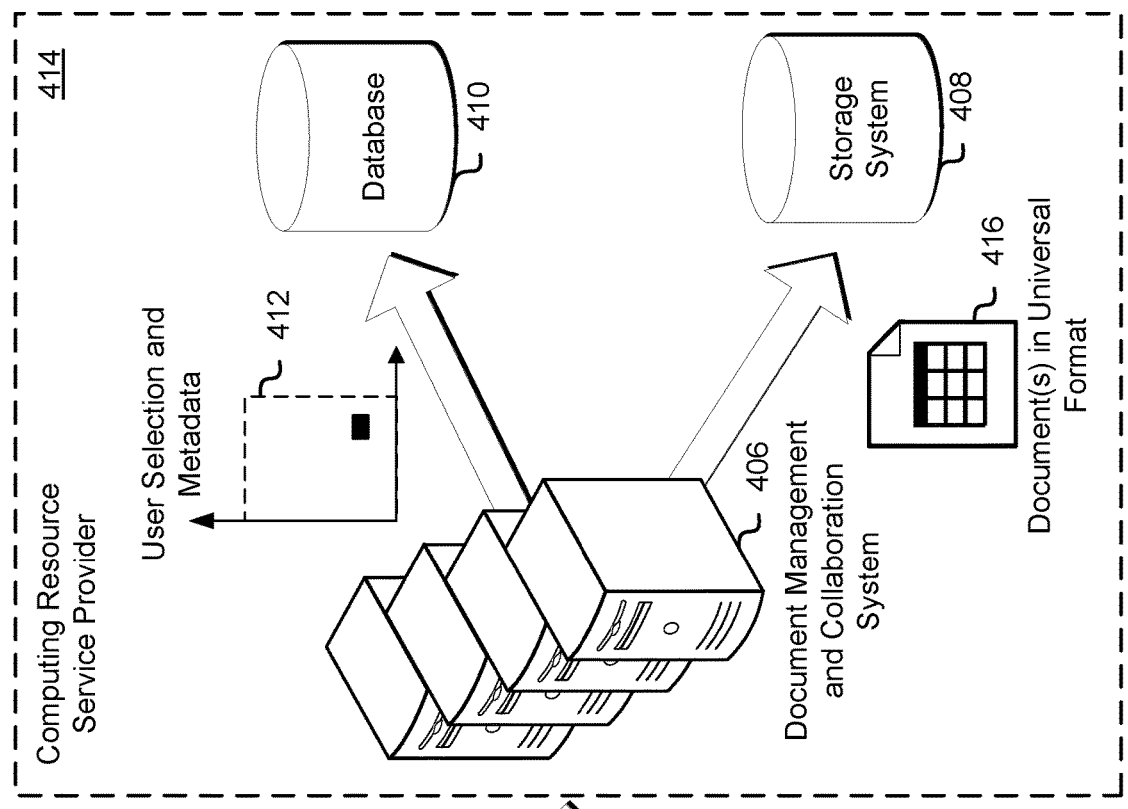
FIG. 4 shows a diagram illustrating document management in accordance with various aspects of the present disclosure.
Figure 4:
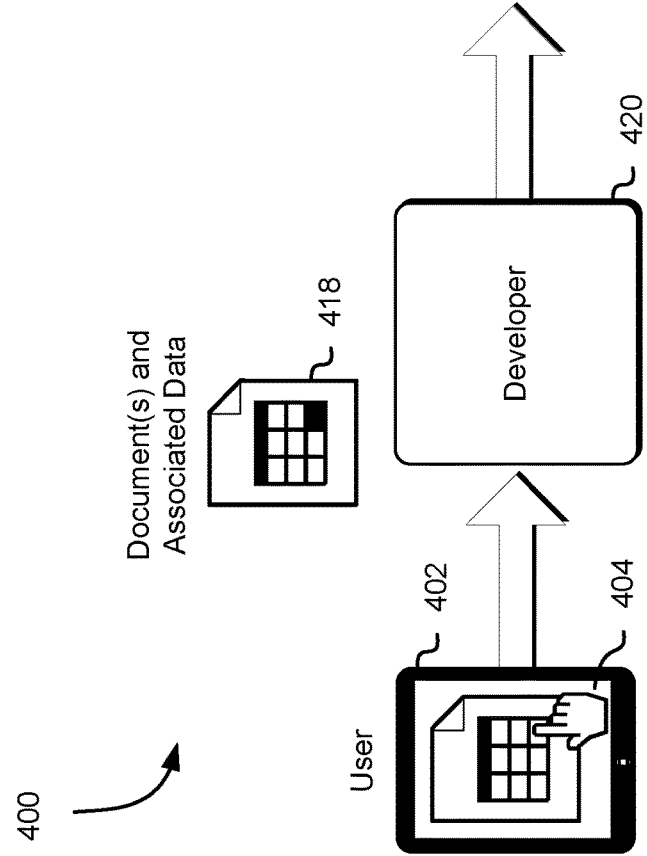

FIG. 4 shows a diagram illustrating a developer 420 interacting with the document management and collaboration system 406 in accordance with various aspects of the present disclosure. In particular, FIG. 4 shows environment 400 which illustrates an example of a user operating a computing device 402 such as a smartphone or tablet. The user may have collaborated on the document by providing a selection and associated interaction 404 with the document including interaction with a developer component. The document may have been created by the user or may have been created by another user using an application provided by the developer 420. The other user may have requested collaboration on the document. Collaboration on the document may include activities such as selection and associated interaction 404, such as drawing a figure in the document as described above in connection with FIG. 3. Once the user has collaborated on the document, the user may then submit the document to the developer 420. Submission of the document to the developer 420 may include the computing device 402 transmitting the document 418 and associated data to the developer 420. The associated data may include created and/or modified annotations, comments, text selection, developer component or any other collaborative actions performed in the document.

The developer may receive the document 418 and associated data and perform one or more operations on the document 418 and associated data. For example, the developer 420 may generate, document 418 and associated data, one or more files to be used with the document management and collaboration system 406. For example, the developer 420 may generate an underlay to be used with the document management and collaboration system. In another example, the developer 420 may receive information from the computing device 402 and generate an overlay based on the received information or insert the received information into the overlay. The received information may include graphical elements, screen coordinates, location information, media files, sensor data, authentication information, user generated tags or any other information suitable for inclusion in the overlay. The developer may then transmit the files to the document management and collaboration system 406. The files may be transmitted in a variety of different ways including API calls, SDK functions, webpage, web application or any other technique suitable for transmitting files and information over a network.

In various embodiments, the transmitted files are received by one or more other systems of the service provider and are directed to the appropriate system or subsystem. For example, the service provider may operate one or more listening devices on a network responsible for receiving requests from users of the service provider and directing the requests to the appropriate system. These other systems may first cause the documents 418 and associated data to be stored in the storage system 408 of the service provider and provide notification to the document management and collaboration system 406 that documents 418 and associated data have been stored in the storage system 408. For example, a listening device may receive a request from the user to process documents 418 and associated data. The listening device may then cause the document 418 and associated data to be stored in the storage system 408. After the document 418 and associated data has been stored in storage system 408, the listening device may transmit a notification including a URL to the location of the stored file to the document management and collaboration system 406. Upon receiving the notification from the listening device, the document management and collaboration system 406 may download the documents 418 and associated data based at least in part on the URL included in the notification. The document management and collaboration system 406, the database 410 and the storage system 408 may be located in one or more data centers operated by the computing resource service provider 414 of the service provider.

The documents 418 and associated data may include the document in the file format it was originally received by the document management and collaboration system 406, annotations created by the user, a hash of the documents, a hash of the associated data, an overlay, an underlay, a coordinate map, a timestamp, developer component or any other information suitable for document collaboration. Furthermore, the documents 418 and associated data may be provided by an API call to the service provider. Once received by the document management and collaboration system 406, the document management and collaboration system may determine if the documents 418 have been changed. If the documents 418 have been changed, the documents can be saved as a new version of the documents 418. However, if the documents 418 have not been changed, they may not be processed and overhead from processing the files may be reduced. The document management and collaboration system 406 may determine if the documents 418 and/or the associated data has changed in a variety of different ways. For instance, the hash submitted with the documents 418 and associated data may be compared with a hash of a previous version of the documents and any associated data corresponding to the particular version of the document in order to determine if a change has been made. The hash may further include all or a portion of the file path to determine if a change has been made to the directory structure. In another example, an inverted bloom filter may be used to determine if a change has been made in the document.

Once it is determined that a change has been made to the documents 418 and/or the associated data, a new version of the document may be stored based at least in part on the documents 418 and associated data transmitted by computing device 402. Information corresponding to the document such as user selection of text in the document and corresponding metadata 412 may be written into a database 410 entry corresponding to the document. The user selection of text and corresponding metadata 412 may include metadata corresponding to the document and the particular version of the document. Furthermore, the information corresponding to the document may be based at least in part on the document 418 and data associated with the document as transmitted by the computing device 402. For example, a new version identification number may be generated and written into the database 410 along with the raw coordinate of the user's selection of text and associated annotations. Other information such as a Uniform Resource Locator (URL) for the documents 418 may also be written into the database. Information corresponding to the user responsible for submitting the documents 418 and associated data. The annotations or changes submitted by the user may also be stored in the database 410. In various embodiments, the database 410 contains the raw coordinates for the user selection and only the documents in universal format 416 are stored in the storage system 408.

After the information in the database has been updated, the document management and collaboration system 406 can store the new versions of the documents 418 and associated data. The document management and collaboration system 406 may retrieve the documents 418 and associated data from the storage system 408 of the service provider or the document management and collaboration system may have received the documents 418 directly from the computing device 402. The document management and collaboration system 406 may receive the underlay, the coordinate map and overlay from the computing device 402 and/or the developer 420 and associated the underlay, the coordinate map and overlay with a new version of the document. If the documents 418 as received are not in the universal file format the document management and collaboration system may covert the documents 418 to a universal file format and generate the associated coordinate map. Along with the underlay and coordinate map, one or more thumbnail images of the documents may also be generated.

The document management and collaboration system 406 may store the annotations and/or comments included in the documents and associated data 418 when saving the new version of the document. As described above, the annotations to a document may be stored in a separate file which may contain both the annotations and the coordinates of the user selected text associated with the annotations. The documents and associated data 418 may also include developer components or information corresponding to developer components. This information may be used by a user device to draw the highlighted words and the associated comments and/or developer components. The document management and collaboration system 406 may receive the user annotations and associated text selection directly from the computing device 402 from which the user entered the information or from some other service or system of the service provider. The document management and collaboration system 406 may update the annotation index using the user annotations and associated coordinates of the user selected words based at least in part on the bounding box for each word. The text of the annotations and/or the documents 418 may be extracted in order to enable searching of the documents. In various embodiments, the extracted text is transmitted to one or more other systems of the service provider in order to update a search index which enables users to search documents stored remotely by the service provider.

In various embodiments, all or a portion of the user selection and metadata 412 may be injected into the document by the document management and collaboration system 406. The user selection and metadata 412 may be injected into the document by the document management and collaboration system 406 once it has been received or it may be stored in database 410 and injected into the document once an indication to inject the user selection and metadata 412 has been received. The document management and collaboration system 406 may inject the user selection and metadata 412 by retrieving the document in the file format it was originally received by the document management and collaboration system 406 or a copy of the document in the format originally received and extracting data from the user selection and metadata 412. The extracted data may include user generated comments and annotations as well as the corresponding document coordinates for the user generated comments and annotations. Based at least in part on the document coordinates and the coordinate map corresponding to the document, the document management and collaboration system 406 may determine a start location and an end location for inserting the extracted data. Based at least in part on the start location and the end location the document management and collaboration system 406 may inject the extracted data thereby creating a new version of the document. The document management and collaboration system 406 or one or more other systems of the computing resource service provider 414 may then generate the document in universal format 416, underlay and coordinate map based at least in part on the new version of the document. The document in universal format 416 and other data generated based at least in part on the new version of the document may be stored in storage system 408. If only a portion of the user selection and metadata was injected into the document, the remainder of the user selection and metadata may be stored in the database 410. The developer 420 may also indicate user selection and metadata 412 to be injected into the document including developer components stored in the user selection and metadata to be injected into the document. For example, the developer 420 may transmit an API call to the document management and collaboration system 406, requesting injection of developer components stored in the overlay such as the graphical elements described above in connection with FIG. 3.

After a new version of the document is stored, a notification may be sent to one or more users specified in the database. For example, the user specified as the owner or creator of the document may be notified that a new version of the document has been created. In another example, if the documents 418 and associated data were transmitted to a particular user for collaboration, the user responsible for having the documents 418 and associated data transmitted to the particular user may be notified that the requested collaborator has uploaded a new version of the document. The notification may be sent by one or more systems of the service provider and may include e-mail, SMS or any other suitable means for notifying a user.

New versions of the documents 418 and associated data may be stored by the service provider without an explicit command to make a new version of the documents 418 and associated data. For example, when a user collaborates on and/or edits a document and submits the document for storage with the service provider, the documents 418 and associated data transmitted from the user's computing device 402 to the service provider are used to store a new version of the document without an explicit command from the user to make a new version of the document. Furthermore, previous versions of documents 418 and associated data may be persistently stored in one or more storage systems of the service provider until deleted by explicit command to delete or another event (e.g., an account remaining inactive for a specified amount of time).

Figure 5:
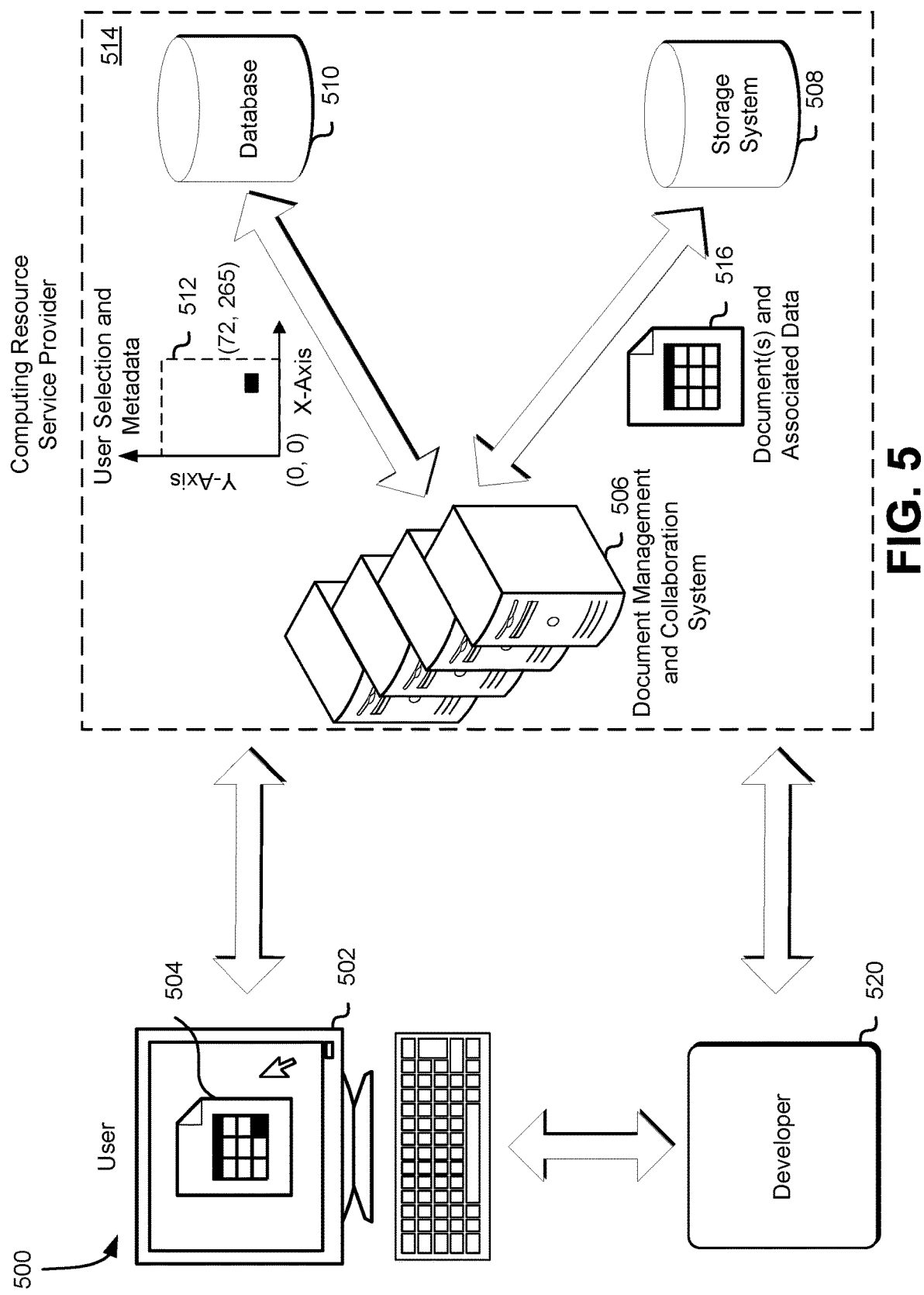
FIG. 5 shows a diagram illustrating document management in accordance with various aspects of the present disclosure.

FIG. 5 shows a diagram illustrating document management in accordance with various aspects of the present disclosure. Accordingly, FIG. 5 shows environment 500 which illustrates an example of a user operating a computing device 502 such as a personal computer or desktop computer. Using computing device 502 the user may request one or more documents 504 or portions of the documents 504 from the document management and collaboration system 506 or the developer 520. In various embodiments, the one or more documents 504 are included in a request for collaboration from one or more other users. Once the document management and collaboration system 506 or the developer 520 has received a request it may determine, based at least in part on the requested, one or more files to transmit or caused to be transmitted to computing device 502. For example, the document management and collaboration system 506 may transmit one or more other users' interactions with the document in the document format the document was submitted in. In another example, the developer 520 may transmit an API request to the document management and collaboration system 506. The document management and collaboration system 506 may transmit the documents 504 and associated data to the developer 520 and the developer 520 may enable the user to access the document 504.

The document management and collaboration system 506 may determine the files to transmit by querying a database 510 for information corresponding to the request. For example, the request may include a document identification number or some other identifying information. The document management and collaboration system 506 may query database 510 based at least in part on information submitted in the request in order to determine a document or a particular document version to transmit to the computing device 502. In various embodiments, a request for collaboration on a document from a user includes a specific version of the document for which collaboration is requested. Based on the results returned from the database 510, the document management and collaboration system 506 may determine a location of one or more files to transmit to the computing device 502 or the developer 520. All or a portion of the files may be located in one or more storage systems operated by the developer 520. The developer 520 may also have copies of all or a portion of the files. For example, the document management and collaboration system 506 may determine an underlay, overlay, coordinate map and other data associated with the document to transmit to computing device 502 or the underlay, overlay, coordinate map and other data associated with the document may be stored by the developer 520. This may include user selection and metadata 512 associated with the document as well as the documents and associated data 516 themselves.

The document management and collaboration system 506 may also determine a location of the files and transmit the location of the files to the computing device 502 enabling the computing device 502 or developer 520 to retrieve the files. The underlay and coordinate map may be stored in storage system 508 and the metadata corresponding to the document may be stored in database 510. The database 510, storage system 508 and the document management and collaboration system 506 may be located in the same datacenter operated by the computing resource service provider 514 or may be located in different datacenters. The document management and collaboration system 506 may also inject all or a portion of the user selection and metadata 512 into the documents 516 before transmitting the documents to computing device 502 or developer 520. Furthermore, if the user requests only the user selection and metadata 512 or a portion of the user selection and metadata 512, the document management and collaboration system 506 may retrieve the requested information from the database 510. For example, the user may request only a particular user's interactions with the document. The document management and collaboration system 506 may then retrieve the particular user's interactions with the document from the database 510 and transmit the particular user's interactions with the document to the computing device 502 or the developer. The document management and collaboration system 506 may also convert the user selection and metadata 512 into the document format the document was originally submitted in or another document format.

Figure 6:
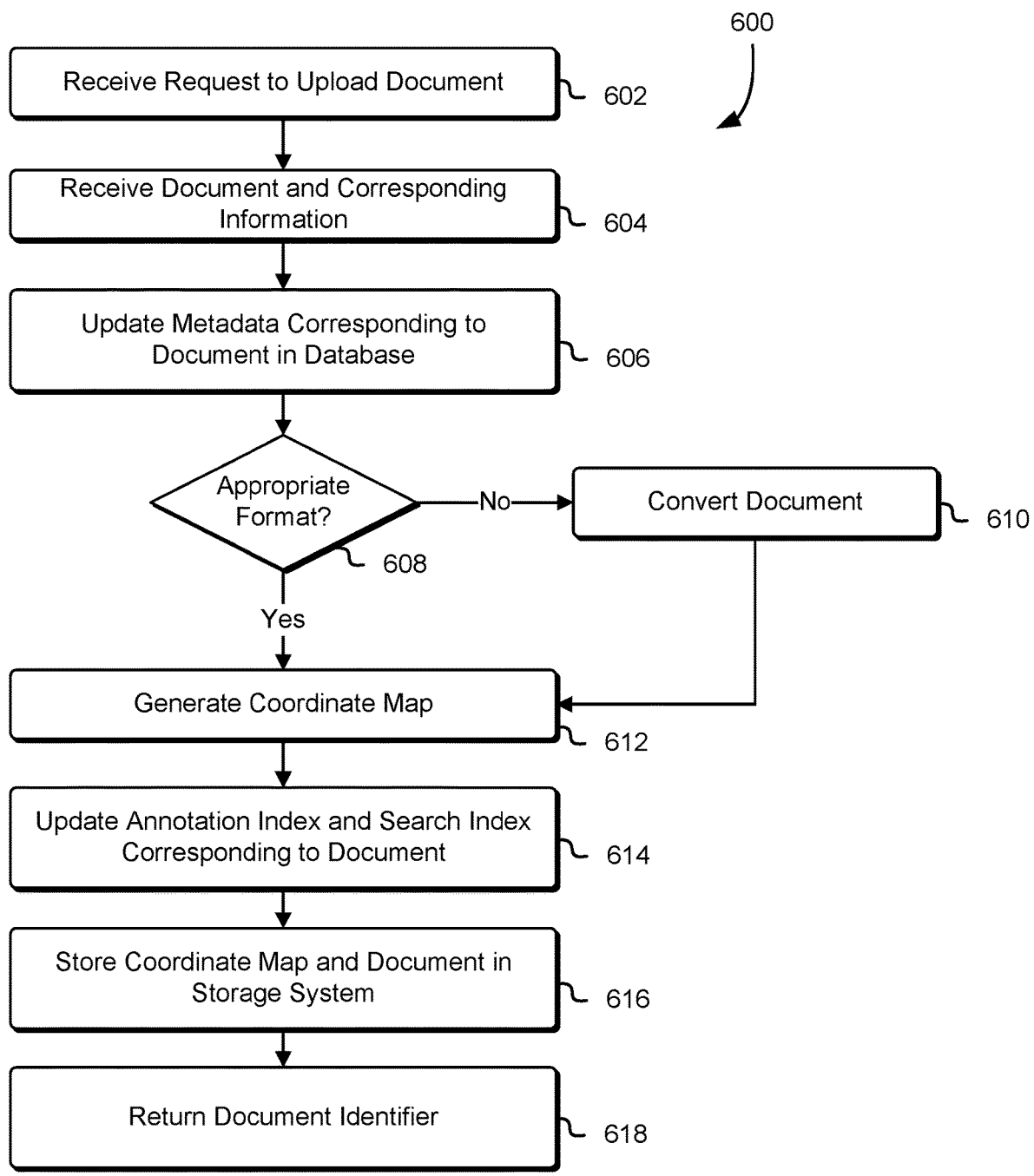
FIG. 6 shows an illustrative example of a process for receiving a document from a developer in accordance with at least one embodiment.

FIG. 6 shows an illustrative example of process 600 which may be used to stored document and associated data received from developer. The process 600 may be performed by any suitable system, such as the document management and collaboration system 506, described above in connection to FIG. 5. Returning to FIG. 6, in an embodiment, the process 600 includes receiving a request to upload document 602. The request may be generated by a developer as described above in connect with FIG. 4. The request may include one or more API calls containing information about the document, the developer and/or a user associated with the document. The user may be a collaborator on a document with one or more permissions to edit the particular document. The user may generate annotations, comments or developer components using a computing device such as those described above with reference to FIG. 3. The computing device may transmit the document directly to the document management and collaboration system performing process 600 or the developer may receive the document from the computing device and transmit the document on behalf of the user. If the document is stored remotely on the storage system operated the developer, the document management and collaboration system may download the document and any other corresponding file directly from the remote storage system.

The document management and collaboration system may then receive the document and corresponding information 604. For example, the document and corresponding information 604 may be transmitted to the document management and collaboration system in an API call from the developer. The document management and collaboration system may then update metadata corresponding to the document in a database 606. For example, the document management and collaboration system may write the location of the document into the database as described above in connection for FIG. 4. The metadata may also include information corresponding to the developer, such as a developer component or authentication information for the developer. Once the document is received it may be determined if the document is in an appropriate format 608. If the document is not in the appropriate format it may be converted to the appropriate format 610. For example, if the document is not in PDF format the document management and collaboration system may convert the document to PDF format. In numerous variations of process 600, other file formats may be used such as image file formats or other file formats configurable to include a device independent coordinate system.

If the document is already in PDF format, for example if the developer converted the document into PDF format prior to transmitting it to the document management and collaboration system, process 600 may continue and generate a coordinate map corresponding to the document 612. The coordinate map may be based on the location of character, word or delimiters in the document. In various embodiments, the coordinate map is a JavaScript Object Notation (JSON) file generated based at least in part on the document, where the JSON file defines word bounding boxes for all the words contained in the files. A variety of techniques may be used to generate the coordinate map. For example, the document is converted to PDF file format and may then be processed as a steam of characters. For each character in the document the document management and collaboration system may determine the top-left coordinate, and the height and width for each particular character. Each character in a line of the document may then be bound together with a line bounding box. The line bounding box may be generated by processing the stream of characters until a delimiter indicating the end of the line is reached. Line bounding boxes may also be generated by determining if the two consecutive characters processed in the stream satisfy the conditions for being on the same line.

For example, two characters may be considered on the same line if the top-left coordinate of the first character is above the top-left of the second character and the base of the first character is above the base of the second character. For any two consecutive characters in the stream, the document management and collaboration system may determine this information based at least in part on the top-left coordinate, and the height and width determined for each character. Other conditions exist that, if satisfied, indicate that two characters are on the same line. If the top-left coordinate of the second character is above the top-left of the first character and the base of the second character is above the base of the first character, the character can be considered on the same line. Similarly if the top-left coordinate and the base of either character is within the top-left coordinate and the base of the other character, the character can be considered on the same line.

Once it is determined that two consecutive characters are no longer on the same line, the end of the line bounding box may be drawn. The line bounding box may be drawn by using the top-left coordinate of the first character on the line and the top-left coordinate and width of the last character in the line. After all the line bounding boxes are computed, each line may be processed individually to determine a bounding box for each word in the line. As the document is processed the average width of white spaces and characters in the document is computed. If the distance between current characters and the next character is less than average width of the characters in the document as computed, the characters may be considered as belonging to the same word. If the distance is greater than the average width of the character in the document, the next character may be considered as the next word in the line bounding box. Once it is determined that the next character belongs to the next word, the document management and collaboration system may generate the word bounding boxes in a similar manner as it did the line bounding box.

Once the document management and collaboration system has generated the word bounding boxes it may be determined from the bounding boxes the coordinates of each word in the document. Padding may also be added to each bounding box around the words in order to facilitate user selection of words during collaboration of a document. The document management and collaboration system may determine an appropriate amount of padding to add to each word bounding box based at least in part on the height of each line and the spacing between lines, dividing the area proportionally in such a way that the word bounding boxes touch. The bounding box information generated by the document management and collaboration system may be stored in a file such as a JSON file.

In numerous variations to process 600, the coordinate map may be generated by the developer and included with the document when transmitted to the document management and collaboration system. The document management and collaboration system may the update the annotation index and search index correspond to the document 614. The asynchronous search engine 246 may extract text from the document and/or corresponding files and use the extracted text to update the annotation index and the search index. The coordinate map and document may then be stored in a storage system 616 operated by the service provider. The file may be stored with the original document in the storage system of the service provider. The document management and collaboration system may then return a document identifier 618 to the developer. The document identifier may be configure to enable the developer to access the document and associated data stored in one or more storage systems of the service provider by the document management and collaboration system.

Figure 7:
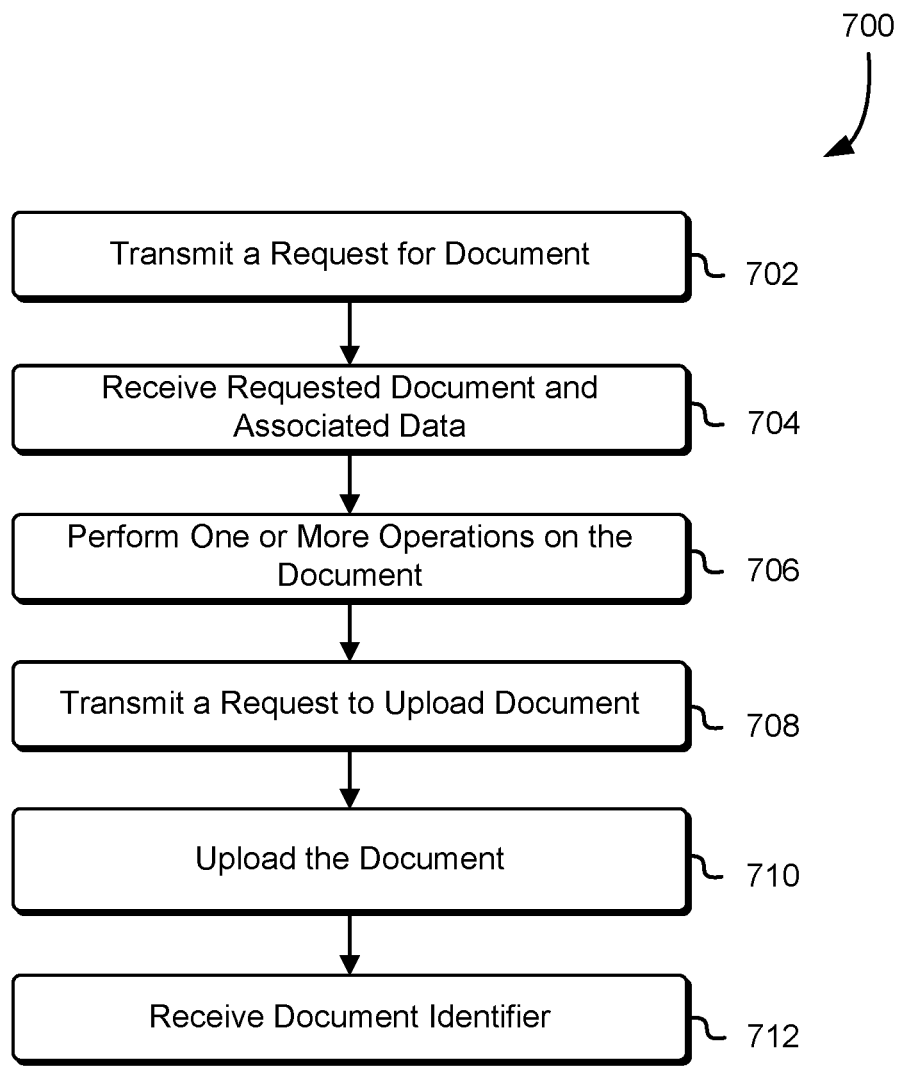
FIG. 7 shows an illustrative example of a process for performing an operation on a document in accordance with at least one embodiment.

FIG. 7 shows an illustrative example of process 700 which may be used to provide document management and collaboration of one or more users of a developer. The process 700 may be performed by any suitable system, such as the developer 520, described above in connection to FIG. 5. Returning to FIG. 7, in an embodiment, the process 700 includes transmitting a request for a document 702. The request may be an appropriately configured API call generated by the developer including one or more document identifiers and authentication information. The request may be associated with one or more users of the developer and/or users of the document management and collaboration system. The developer may then receive the requested document and associated data 704. The associated data may include an underlay, coordinate map and/or overlay associated with the document. In numerous variations to process 700, the document and associated information may be pre-fetched or copies of the document and associated information may already be stored with the developer.

Returning to FIG. 7, the developer may perform one or more operations on the document 706. For example, the developer may provide a storage aggregation service to one or more users and the developer may store the document and associated data for the one or more users. In another example, the developer may provide one or more developer components to the one or more users, such as the ability to draw figures in the document as described above in connection to FIG. 3. The developer may also insert information into the document such as image, animation or video files. The developer may convert to document to one or more other document formats or extract information from the document for use by the document management and collaboration system. The developer may then transmit a request to upload the document 708 to the document management and collaboration system. The document may include associated data and/or information generated by the developer during the performance of the one or more operations. The request may include the document or may include information corresponding to the location of the document thereby enabling the document management and collaboration system to retrieve the document.

The developer may then upload or cause to be uploaded the document 710 to the document management and collaboration system or one or more servers or service of the service provider. In response to uploading the document, the developer may receive a document identifier 712. The document identifier may be configured to identify the document and other data uploaded by the developer. The document identifier may include a URL or URI corresponding to the document. The document identifier may also include information contained in the database 410 as described above in FIG. 4 or the document identifier may point to information contained in the database 410.

Figure 8:
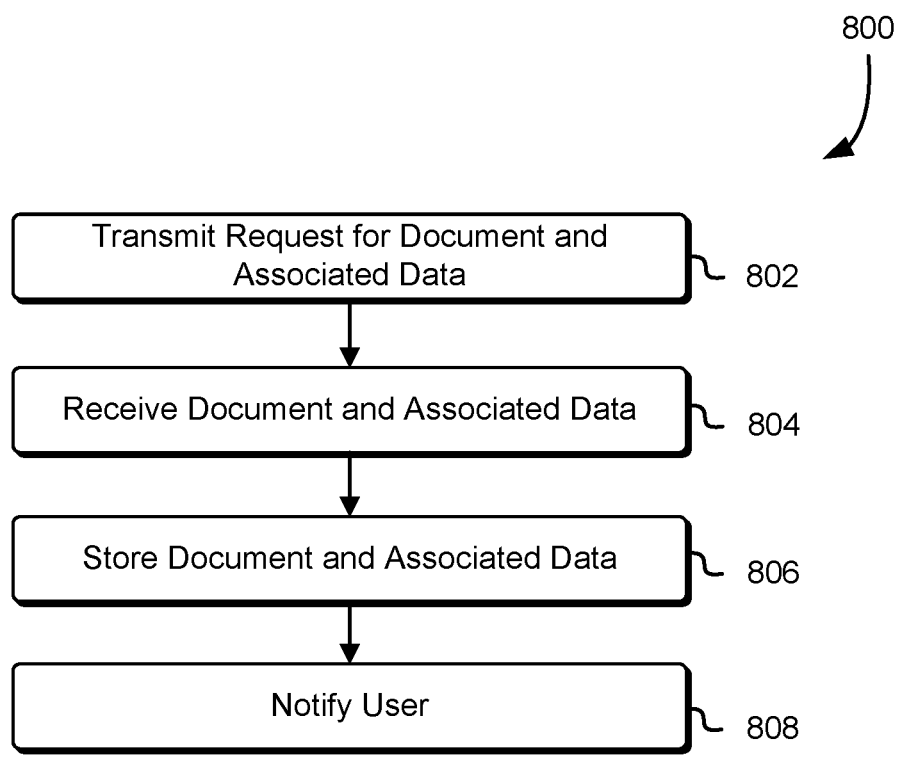
FIG. 8 shows an illustrative example of a process for transmitting a document to a developer accordance with at least one embodiment.

FIG. 8 shows an illustrative example of process 800 which may be used to provide document management and collaboration of one or more users of a developer, such as a storage aggregation developer. The process 800 may be performed by any suitable system, such as the developer 520, described above in connection to FIG. 5. Returning to FIG. 8, in an embodiment, the process 800 includes transmitting a request for a document and associated data 802. The request may be an API call generate by the developer including a document identifier. The associated data may be identified by the document identifier or another identifier. The associated data may include data generated by the developer corresponding to one or more developer components, such as described above in connection with FIG. 3. In response to the request to document management and collaboration system may transmit the document to the developer or may transmit the document identifier to the developer thereby enabling the developer to have access to the document and associated data. The developer may then receive the document and associated data 804. Receiving the data may include retrieving the data from one or more remote storage devices.

Once the developer has received the document and associated data 804, the developer may store the document and associated data 806. The document and associated data may be stored in one or more storage device operated by the developer. The developer may aggregate document and associated data for one or more users of the document management and collaboration system. The developer may then notify the user 808 that the document and associated data has been stored with the developer. The notification may include providing the document and associated data to a computing device operated by the user or enabling the computing device operated by the user to access the document and associated data stored by the developer.

Figure 9:
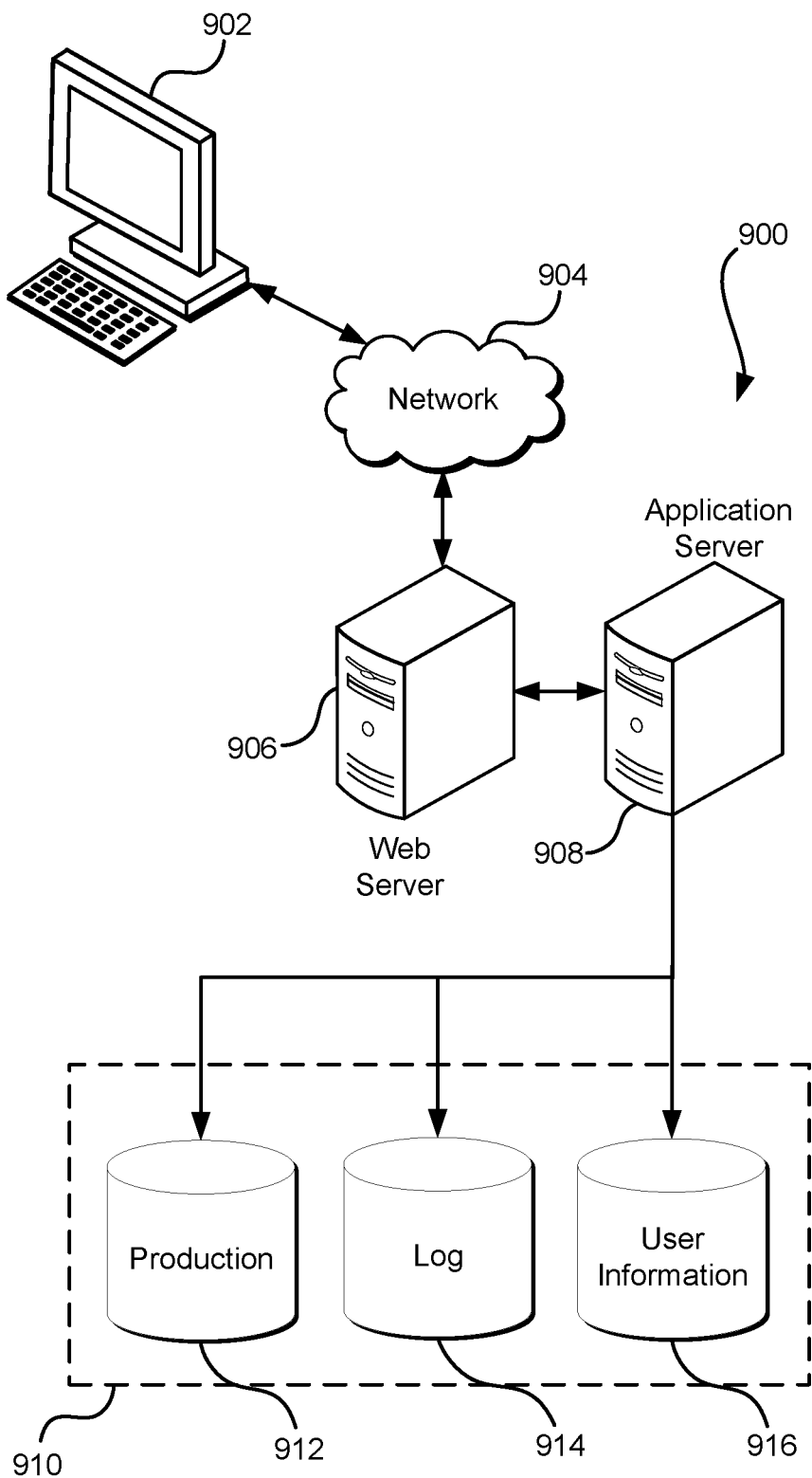
FIG. 9 illustrates an environment in which various embodiments can be implemented.

FIG. 9 illustrates aspects of an example environment 900 for implementing aspects in accordance with various embodiments. As will be appreciated, although a web-based environment is used for purposes of explanation, different environments may be used, as appropriate, to implement various embodiments. The environment includes an electronic client device 902, which can include any appropriate device operable to send and/or receive requests, messages or information over an appropriate network 904 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 902 and the application server 908, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 910 can include several separate data tables, databases, data documents, dynamic data storage schemes and/or other data storage mechanisms and media for storing data relating to a particular aspect of the present disclosure. For example, the data store illustrated may include mechanisms for storing production data 912 and user information 916, which can be used to serve content for the production side. The data store also is shown to include a mechanism for storing log data 914, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. The application server 908 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 902. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C # or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
   receiving information indicating one or more operations performed on a document such that the one or more operations cause an overlay corresponding to the document to be modified;
   transmitting, over a network, information to identify the document and the overlay corresponding to the document;
   receiving an identifier to identify a new version of the document and an underlay corresponding to the document; and;
   causing the identifier to be stored such that one or more collaborators have access to the identifier.

2. A system, comprising:
   one or more processors;
   memory with instructions that, when executed by the one or more processors, cause the system to:
      obtain, from a user, one or more operations on a document such that the operations cause an overlay corresponding to the document to be modified;
      transmit, over a network, information configured to identify the document and the overlay corresponding to the document;
      obtain an identifier that identifies a new version of the document and an underlay corresponding to the document; and
      cause the identifier to be stored such that one or more collaborators have access to the identifier.

3. A non-transitory computer-readable storage medium having collectively stored thereon executable instructions that, when executed by one or more processors of a computer system, cause the computer system to at least:
   transmit, over a network, a document and an overlay associated with the document, the overlay including information corresponding to one or more collaborations on the document;
   receive, in response to the transmitted document and the overlay, information configured to identify a second version of the document corresponding to the one or more collaborations on the document; and
   transmit an indication to one or more users that the one or more collaborations have been transmitted.

4. The computer-implemented method of claim 1, wherein the document is of a universal file format.

5. The computer-implemented method of claim 1, wherein the computer-implemented method further includes storing the document in a document management and collaboration system.

6. The computer-implemented method of claim 1, wherein the computer-implemented method further includes transmitting coordinates corresponding to a location of annotations made to the document by a document management and collaboration system.

7. The computer-implemented method of claim 1, wherein the computer-implemented method further includes converting the document to a universal file format.

8. The computer-implemented method of claim 1, wherein transmitting a second version of the document to one or more collaborators for collaboration includes transmitting a second document identifier to one or more collaborators such that the second document identifier enables the one or more collaborators to access the document.

9. The system of claim 2, wherein the memory further includes instructions that, when executed by the one or more processors, cause the system to transmit one or more media files associate with the overlay corresponding to the document.

10. The system of claim 2, wherein the memory further includes instructions that, when executed by the one or more processors, cause the system to generate the document and the overlay based at least in part on the one or more user operations.

11. The system of claim 2, wherein transmitting the information configured to identify the document and the overlay corresponding to the document further includes transmitting an underlay corresponding to the document.

12. The system of claim 2, wherein the memory further includes instructions that, when executed by the one or more processors, cause the system to:
  obtain, from at least one of the one or more collaborators, a second overlay corresponding to the document containing information corresponding to collaborations on the document; and
  transmit information configured to identify the document and the second overlay to the user.

13. The system of claim 2, wherein the overlay includes non-alphanumeric data.

14. The system of claim 2, wherein the memory further includes instructions that, when executed by the one or more processors, cause the system to:
  transmit a request for a second document;
  modify a second overlay corresponding to the second document based at least in part on the user's interactions with the second document; and
  transmit a request to store the second document and second overlay remotely from the user such that the second document is accessible to the user and inaccessible to the one or more collaborators.

15. The non-transitory computer-readable storage medium of claim 3, wherein the instructions further comprise instructions that, when executed by the one or more processors, cause the computer system to generate, based at least in part on the document and the overlay, a coordinate map corresponding to the location of content in the document.

16. The non-transitory computer-readable storage medium of claim 3, wherein the instructions further comprise instructions that, when executed by the one or more processors, cause the computer system to generate the document and the overlay based at least in part on the one or more user interactions with the document.

17. The non-transitory computer-readable storage medium of claim 3, wherein the instructions that cause the computer system to generate the document and the overlay further include instructions that cause the computer system to insert a animation into the overlay.

18. The non-transitory computer-readable storage medium of claim 3, wherein the instructions further comprise instructions that, when executed by the one or more processors, cause the computer system to request, from at least a portion of the one or more users, collaboration on the document.

19. The non-transitory computer-readable storage medium of claim 3, wherein the instructions further comprise instructions that, when executed by the one or more processors, cause the computer system to transmit, to the document management and collaboration system, data to be injected into the document.

20. The non-transitory computer-readable storage medium of claim 3, wherein the instructions that cause the computer system to transmit the document and the overlay further include instructions that cause the computer system to transmit the document such that the document is only accessible to a particular user responsible for causing the document to be transmitted.

* * * * *